Feb. 1, 1955     E. L. BRASOL     2,700,847
FLOWERPOT
Filed May 3, 1951

INVENTOR.
EUGENE L. BRASOL
BY
*Busser and Harding*

United States Patent Office 2,700,847
Patented Feb. 1, 1955

2,700,847

FLOWERPOT

Eugene L. Brasol, Daytona Beach, Fla.

Application May 3, 1951, Serial No. 224,316

1 Claim. (Cl. 47—34)

This invention relates to an improved flower pot.

At the present time, plants are commonly grown in clay pots which are too heavy for shipment. Hence, before the plant is shipped it is taken out of the clay pot and repotted in a paper pot for shipment. When the plant is received by the consignee, the plant is taken out of the paper pot and repotted into a clay pot in which it is sold. This repotting operation is a time consuming and costly operation.

It is also known to the prior art to employ flower pots made of plastics, metal and compressed manure. Plastic and metal pots are deficient in that the soil temperature is affected by fluctuations in the temperature of the atmosphere. These variations in soil temperature affect the growth of the plant. Flower pots manufactured from compressed manure or paper are not durable. Plants cannot be shipped in pots formed from compressed manure due to the fact that they are fragile and shatter easily.

It is, therefore, an object of this invention to provide a flower pot formed of a light, durable material in which the plant may be grown, shipped and sold to the ultimate consumer without repotting the plant.

It is a further object of this invention to provide a flower pot formed of a material which is an efficient heat insulator and prevents variations in atmospheric temperature from being transmitted to the soil contained in the pot.

It is a further object of this invention to provide a flower pot which is formed of a porous material having the ability to absorb and retain moisture, thus requiring less frequent watering of the plant in the pot.

It is a further object of this invention to provide a flower pot formed of a porous material which may be impregnated with a plant fertilizer.

It is a further object of this invention to provide a flower pot which is a new article of manufacture formed from the wood of the Southern palm tree.

In forming the improved flower pot of the present invention, a portion of the tree trunk of the Southern palm tree is placed on an automatic shaping machine and the palm trunk is formed into the shape of a conventional flower pot having a recess therein, a conical outer surface with a shoulder at the top thereof and having a hole in the bottom of the recessed portion which permits excess moisture to drain from the flower pot. The flower pot is preferably made of an integral piece of palm wood but it may be made of several pieces joined together and may have other materials incorporated therein. For example, in manufacturing a flower pot, a piece of palm wood may have a hole bored clear through it and have the exterior shaped in the conventional shape of a flower pot. A separately shaped bottom is then inserted in the flower pot and it can be replaced if necessary, thus prolonging the useful life of the pot. The replaceable bottom is advantageous due to the fact that the bottom usually deteriorates before the rest of the pot.

When the flower pot is taken from the automatic shaper, it is then ready for use and it is preferably impregnated with a plant fertilizer such as a solution of 90% animal blood and 10% phosphoric acid, high grade tankage, or any other plant fertilizer formula which is beneficial to a specific plant. The impregnation may be effected by spraying, soaking, or other convenient means.

The plant fertilizer absorbed by the porous palm wood is released gradually to the soil placed in the pot and consequently, is gradually received by the plant in the soil.

In the accompanying drawing.

Figure 1:
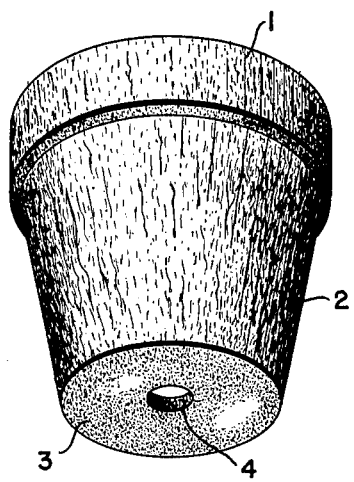
Figures 1 and 2 are perspective views of the improved flower pot of this invention.
Figure 2:
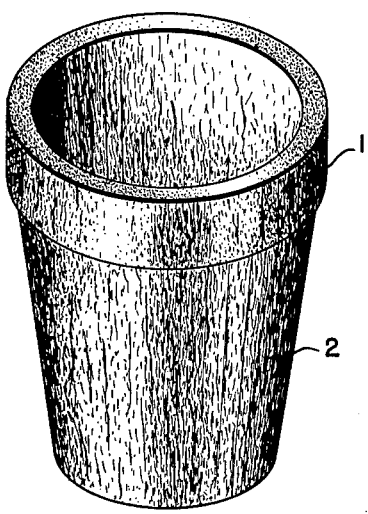

Referring specifically to Figures 1 and 2, the flower pot is formed of an integral piece of palm wood having a shoulder 1 formed at the top thereof, conical sides 2, and a bottom 3 having an aperture 4 therein for the escape of excess moisture.

Figure 3:
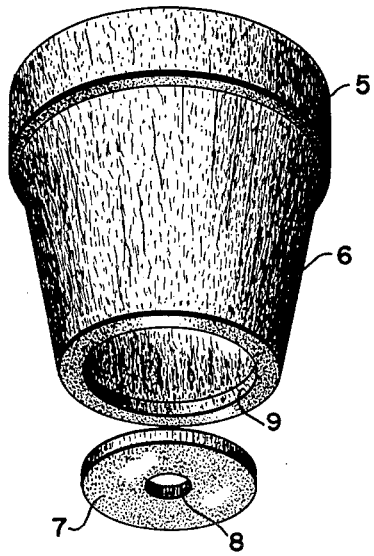
Figure 3 is an exploded perspective view of the improved flower pot of this invention showing a modified construction.

Referring specifically to Figure 3, the flower pot is shown with a modified construction having a shoulder 5 formed at the top thereof, conical sides 6 and a replaceable bottom 7 having an aperture 8 therein for the escape of excess moisture. The replaceable bottom 7 may be pressed-fitted in opening 9 in the bottom of the flower pot or it may be secured thereto by any convenient means such as nailing or cementing. It will be appreciated that the replaceable bottom 7 may be made of palm wood or any other kind of wood or, alternatively, of metal, plastic or the like.

In use it will be appreciated that due to the fact that the palm wood flower pot is light, durable and extremely inexpensive to manufacture, a plant may be placed therein, shipped to a consignee and sold to the ultimate consumer without repotting the plant, which is a feature not economically feasible with any of the flower pots of the prior art. Also, the flower pot may be planted in the ground with the plant therein. The flower pot will then crack or disintegrate due to the roots growing therethrough.

Due to the insulating properties of the palm wood, plants grown in the palm wood flower pot are healthier than those grown in pots of the prior art. Also, less frequent watering is necessary due to the moisture absorbing characteristics of the palm wood.

From the foregoing description, it will be appreciated that various modifications may be made in the device of this invention without departing from the scope thereof.

The scope of the present invention is to be restricted only in accordance with the appended claim.

What is claimed is:

A flower pot adapted to contain soil and a growing plant, said flower pot comprising a shaped section of the trunk of the palm tree, Sabal palmetto, having the characteristics of light weight, durability, resistance to rot, decomposition and disintegration in the presence of moisture and being sufficiently porous to permit impregnation with a plant food and to retain for long periods of time the moisture in the soil which the pot contains.

References Cited in the file of this patent

UNITED STATES PATENTS

| Number | Name | Date |
|---|---|---|
| 1,226,311 | Clifford | May 15, 1917 |
| 1,636,625 | Conrad | July 19, 1927 |
| 2,094,513 | Wilson et al. | Sept. 28, 1937 |
| 2,140,932 | Avery | Dec. 20, 1938 |

FOREIGN PATENTS

| Number | Country | Date |
|---|---|---|
| 4,908 | Great Britain | 1890 |
| 179,055 | Great Britain | May 4, 1922 |
| 198,359 | Switzerland | Sept. 1, 1938 |
| 219,509 | Great Britain | July 31, 1924 |